(12) United States Patent
Kaji et al.

(10) Patent No.: US 6,721,606 B1
(45) Date of Patent: Apr. 13, 2004

(54) METHOD AND APPARATUS FOR OPTIMIZING OVERALL CHARACTERISTICS OF DEVICE

(75) Inventors: Hirotaka Kaji, Iwata (JP); Ichikai Kamihira, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/535,151

(22) Filed: Mar. 24, 2000

(30) Foreign Application Priority Data

Mar. 24, 1999 (JP) .......................................... 11-080489

(51) Int. Cl.[7] ........................... G05B 11/01; G05B 13/02
(52) U.S. Cl. ............................ 700/17; 700/32; 700/83; 706/11
(58) Field of Search ..................... 700/17, 18, 28–55, 700/83–85, 108–111, 245–250, 264; 706/1–17, 19, 25; 345/701–703, 746, 747, 762–765, 772, 838–840, 865, 866; 703/2, 13, 23; 702/85

(56) References Cited

U.S. PATENT DOCUMENTS

| | | | | |
|---|---|---|---|---|
| 5,265,222 A | * | 11/1993 | Nishiya et al. ................. 706/10 |
| 5,305,014 A | * | 4/1994 | Mutschler et al. ........... 345/173 |
| 5,347,447 A | * | 9/1994 | Kiji et al. ....................... 700/32 |
| 5,465,204 A | | 11/1995 | Sekine et al. .................. 700/32 |
| 5,634,039 A | | 5/1997 | Simon et al. .................. 703/18 |
| 5,808,563 A | * | 9/1998 | Ching et al. .................. 340/976 |
| 5,832,189 A | * | 11/1998 | Tow .............................. 700/259 |
| 5,960,381 A | * | 9/1999 | Singers et al. ............... 702/183 |
| 6,175,772 B1 | * | 1/2001 | Kamiya et al. ................ 700/31 |
| 6,249,780 B1 | * | 6/2001 | Mizokawa .................... 706/23 |
| 6,366,832 B2 | * | 4/2002 | Lomonaco et al. ......... 700/276 |
| 6,452,608 B1 | * | 9/2002 | Goken .......................... 345/716 |
| 6,529,816 B1 | * | 3/2003 | Yamaguchi et al. ........ 701/110 |

FOREIGN PATENT DOCUMENTS

| | | | |
|---|---|---|---|
| EP | 0957416 | * | 11/1999 |
| WO | WO 97/41685 | * | 11/1997 |

* cited by examiner

Primary Examiner—Maria N. Von Buhr
(74) Attorney, Agent, or Firm—Knobbe, Martens, Olson & Bear LLP

(57) ABSTRACT

Performance of a device manipulated by a user is controlled essentially by at least one control module having an input-output relationship regulated by control parameters. Optimization of overall characteristics of the performance can be conducted by (a) preselecting values of the control parameters and activating the device; (b) changing values of the control parameters within predetermined ranges under predetermined coding rules; (c) evaluating the performance of the device based on signals indicative of the performance; (d) displaying to the user the evaluation outcome in the form of intuitively recognizable symbols which are preselected to represent various evaluation outcomes; and (e) selecting values of the control parameters based on the selected symbol(s) by the user. By repeating steps (b) through (e) while operating the device, the at least one control module is optimized.

15 Claims, 18 Drawing Sheets

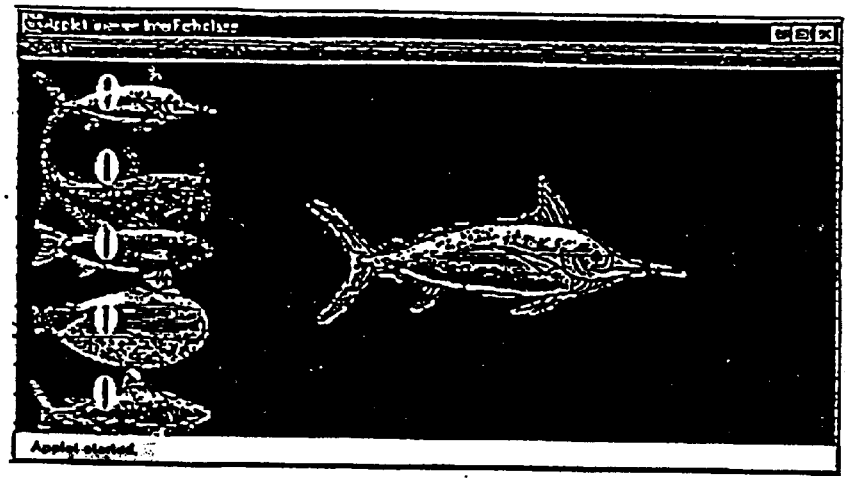
Initial state
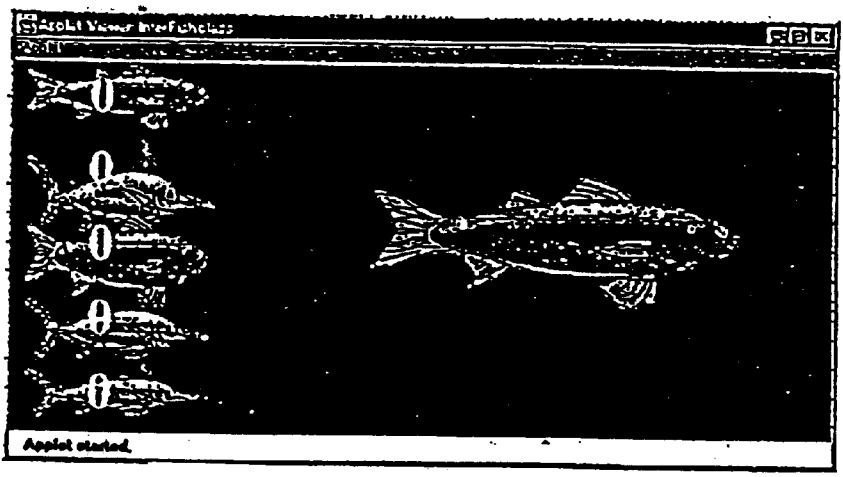
Evolutionary learning in progress
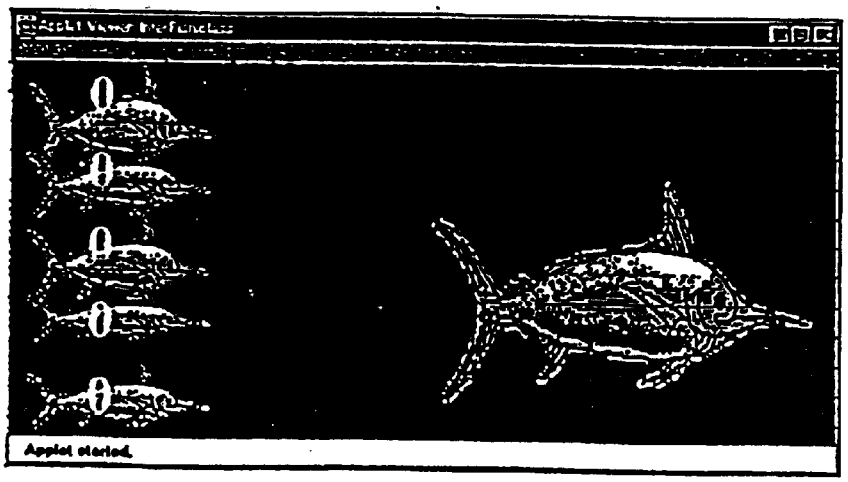
Completion of evolutionary learning

METHOD AND APPARATUS FOR OPTIMIZING OVERALL CHARACTERISTICS OF DEVICE

BACKGROUND OF THE INVENTION

1. Field of the Invention

This invention relates to a method and apparatus for optimizing performance of a device such as a motor, and particularly to an improved method and apparatus for optimizing a control module that controls performance of the device.

2. Description of the Related Art

In the past, optimal values of a characteristic of a control module (namely, parameter values for deciding input-output relationship of the control module) to control a controlled system were determined prior to shipment by experiment during design or assembly, so that users of a product comprising a controlled system were assumed and the users' characteristics (preference, technique, personality, and use) could be met.

However, with the diversity and advancement of recent technology, the conventional method of deciding optimal values of a characteristic of the control module by experiment brings about difficulty for optimizing the control module, and requires a lot of time.

Since personal characteristics or preferences vary from one person to another, the conventional control method cannot provide a characteristic of products which satisfy all users.

In view of the problems described above, a para-evolutionary method has been proposed. In this method, a control apparatus produces a plurality of chromosomes by using control parameters of the control apparatus that exert influence on characteristics of a controlled subject or machine. Some of the chromosomes evolve by a genetic algorithm by selecting favorable chromosomes based upon intention of the user.

The machine used in the above method is operated with the respective chromosomes that are initially produced. The user evaluates the respective operations to reject undesirable chromosomes. Characteristics appropriate to the user can be obtained using this method. However, it is difficult for the user to evaluate subtle changes solely by his or her bodily sensations. For instance, if the method is employed in a control system for an automobile, feelings such as a feeling of subtle differences in acceleration cannot easily be evaluated by a driver because they are unseen. To resolve this problem, another method has been proposed in which a control apparatus links the characteristics of the machine with rectangular patterns and shows the patterns at every chromosome on a display for providing additional information to the user to assist the user's evaluation by his or her bodily sensations.

However, even using this last method, it is still difficult for the user to intuitively grasp the relationships between rectangular patterns and the characteristics of the machine being controlled. The user must learn the relationships by referring to an operating manual or instruction book. This increases the burden on the user. In addition, since the relationships are not intuitive, the user may make mistakes in the evaluation during the optimization process. The mistakes made during optimization may result in the control apparatus responding in a way that deviates from the desired response. Moreover, a number of machines that need the optimization require slow changes in characteristics so that they will not change abruptly in actual operations. Hence, the user may not notice the deviation soon enough. As a result, the control apparatus needs a relatively long period of time.

It is, therefore, a principal object of the present invention to provide a method and apparatus for optimizing overall characteristics by which the user can intuitively grasp characteristics during the optimization process and eliminate mistakes in evaluation.

SUMMARY OF THE INVENTION

The present invention, which is directed to the above-described object, provides a method for controlling performance of a device manipulated by a user. The performance is essentially controlled by at least one control module having an input-output relationship regulated by control parameters, said method comprising the steps of: (a) preselecting values of the control parameters and activating the device; (b) on-line changing values of the control parameters within predetermined ranges under predetermined coding rules; (c) on-line evaluating the performance of the device based on signals indicative of the performance; (d) on-line displaying to the user the evaluation outcome in the form of intuitively recognizable symbols which are preselected to represent various evaluation outcomes; (e) on-line selecting values of the control parameters based on the selected symbol(s) by the user; and (f) repeating steps (b) through (e) while operating the device until desired performance of the device is demonstrated, wherein the at least one control module is optimized. According to the above, a user can intuitively respond to progress of changes in performance of the device, thereby optimizing the performance. No special skills are required.

In the above, optimization is conducted "on-line", i.e., on a real-time basis. Additionally, in one embodiment, pre-optimization is conducted before operating the device, by using the intuitively recognizable symbols.

In another embodiment, the display of the intuitively recognizable symbols changes in accordance with the number of times the cycles of steps (b) through (e) are repeated. According to this embodiment, efficient optimization can be performed by efficiently selecting the symbols.

The display may comprise, in the alternative, visual signals, auditory signals, and tactile signals. The intuitively recognizable symbols may be selected from the group consisting of plants, fish, birds, mammals and living bodies including worms. Alternatively, the intuitively recognizable symbols may be selected from the group consisting of facial expressions and body types.

In one embodiment, optimization is conducted by heuristic processes; that is, step (b) can be conducted using heuristic processes programmed to change values of the control parameters toward a direction of obtaining rewards which are defined by the result of selection by the user in step (e). The heuristic processes include evolutionary computing, such as genetic algorithms. For example, in one embodiment, wherein the control module comprises at least one neural network and the input-output relationship is regulated by coupling coefficients used as the control parameters, step (b) may be conducted by genetic algorithms programmed to form chromosomes containing genes encoding coupling coefficients (the genes being selected to avoid acute changes in the encoded coupling coefficients), and step (e) may be conducted by selecting chromosome(s).

Plural control modules can be used in an embodiment, and when the device's performance is characterized by at least two elements, the control modules are directed to the respective characteristic elements. In the above, optimization by steps (a) through (e) can be conducted on each control module in repetitive sequence. According to this embodiment, overall characteristics of the performance can be optimized.

In the present invention, the device may include a control module for controlling another device. That is, the present invention can be adapted for optimizing a control module which controls another control module. In such embodiments, the device includes a motor (e.g., an electronically controllable driving device including an internal combustion type or electric type), and non-driving device such as computers.

For purposes of summarizing the invention and the advantages achieved over the prior art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

DESCRIPTION OF THE DRAWINGS

These and other features of this invention will now be described with reference to the drawings of preferred embodiments which are intended to illustrate and not to limit the invention.

FIGS. 16a, 16b, and 16c are schematic views, each showing an exemplary method for displaying the characteristics in the characteristic display device.

DETAILED DESCRIPTION OF THE PREFERRED EMBODIMENT

General Structures of Optimization System

Figure 1:
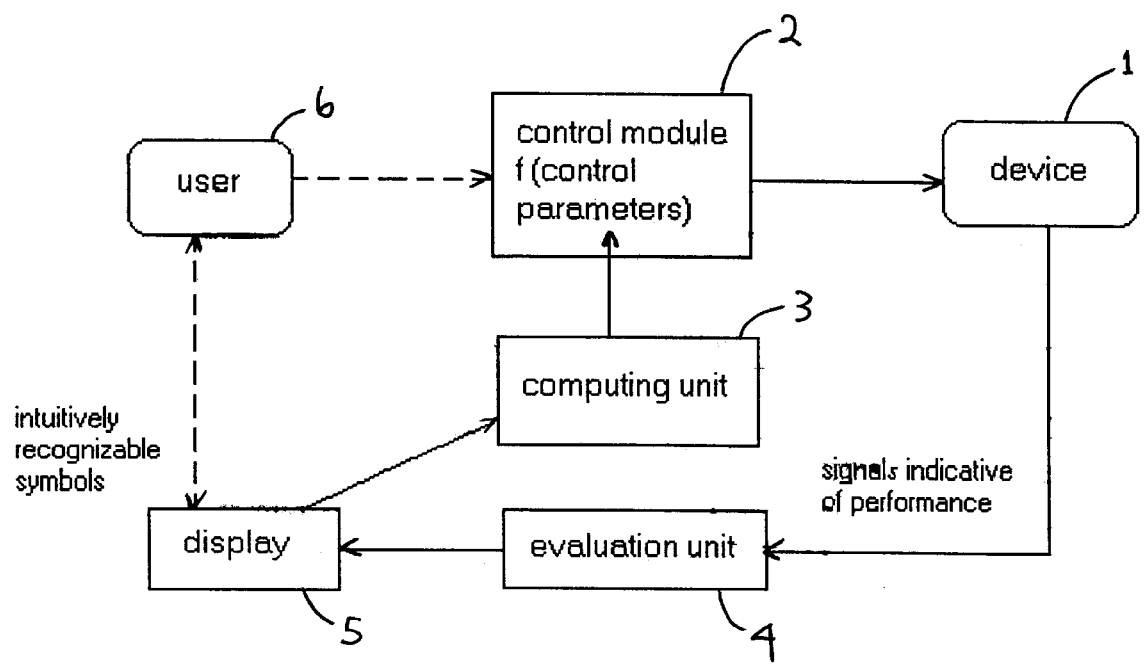
FIG. 1 is a schematic view showing an embodiment of a general structure of the optimization system according to the present invention.

FIG. 1 is a schematic view showing the basic structure of an embodiment of the optimization system according to the present invention. A device 1 is manipulated by a user 6. Performance of the device 1 is controlled essentially by at least one control module 2 having an input-output relationship regulated by control parameters. Initial values of the control parameters are preselected, the device 1 is activated with the initial values. When initiating an optimization process, values of the control parameters are on-line changed (i.e., on a real-time basis) within predetermined ranges under predetermined coding rules by a computing unit 3. The performance of the device is on-line evaluated by an evaluation unit 4 based on signals indicative of the performance. The evaluation outcome is displayed to the user 6 by a display 5 in the form of intuitively recognizable symbols which are preselected to represent various evaluation outcomes. Values of the control parameters are on-line selected in the computing unit 3 based on the selected symbol(s) on the display 5 by the user 6. The above steps are repeated while operating the device until desired performance of the device is demonstrated, thereby optimizing the at least one control module. According to the above, the user 6 can intuitively respond to changes in the performance of the device 1, thereby readily optimizing the performance. No special skills are required. Selection on the display 5 by the user 6 need not be directly used for selecting control parameters at the computing unit 3. Selection on the display 5 may be one of various factors used for selecting control parameters.

The display may comprise visual signals, auditory signals, and tactile signals. The intuitively recognizable symbols may be selected from the group consisting of plants, fish, birds, mammals and living bodies including worms. Alternatively, the intuitively recognizable symbols may be selected from the group consisting of facial expressions and body types.

The computing unit 3 may be programmed to select control parameters by heuristic processes. The heuristic processes include evolutionary computing such as genetic algorithms. For example, when the control module 3 may comprise at least one neural network, the input-output relationship of which is regulated by coupling coefficients used as the control parameters. Selection of control parameters may be conducted by genetic algorithms programmed to form chromosomes containing genes encoding coupling coefficients (the genes being selected to avoid acute changes in the encoded coupling coefficients). To subsequently select control parameters, chromosomes are selected based on the user's selection of symbol(s) on the display 5. The computing unit 3 is programmed to generate new sets of chromosomes based on the selected chromosomes. The computing unit 3 can receive signals from the device 1 as necessary to run the program. The control module 2 can also receive signals from the device 1, the surrounding atmosphere, and/or the user 6, as necessary to output a causative signal to the device 1. Further, the evaluation unit 4 and the display 5 can also receive signals described above. Each unit can be connected to an outside source via the Internet or other communication means, and can be manipulated. For example, the computing unit 3 can download a new program through the Internet to change optimization processes. In an embodiment, any of the computing unit 3, evaluation unit 4, and the display 5 can be physically separated from the device 1. Further, the control module 2 can comprise a memory which stores the selected control parameters. An external memory tip or disk, which stores information on control parameters previously obtained by the computing unit 3, can be connected to the control module 2 so that the previously obtained control parameters can readily be used.

Plural control modules can be used in an embodiment. In such embodiments, the device's performance is characterized by at least two elements and the control modules are directed to the respective characteristic elements.

Application to Combustion Engine

With reference to FIGS. 2 to 17, an apparatus for optimizing overall characteristics for controlling a vehicle engine will be described.

Figure 2:
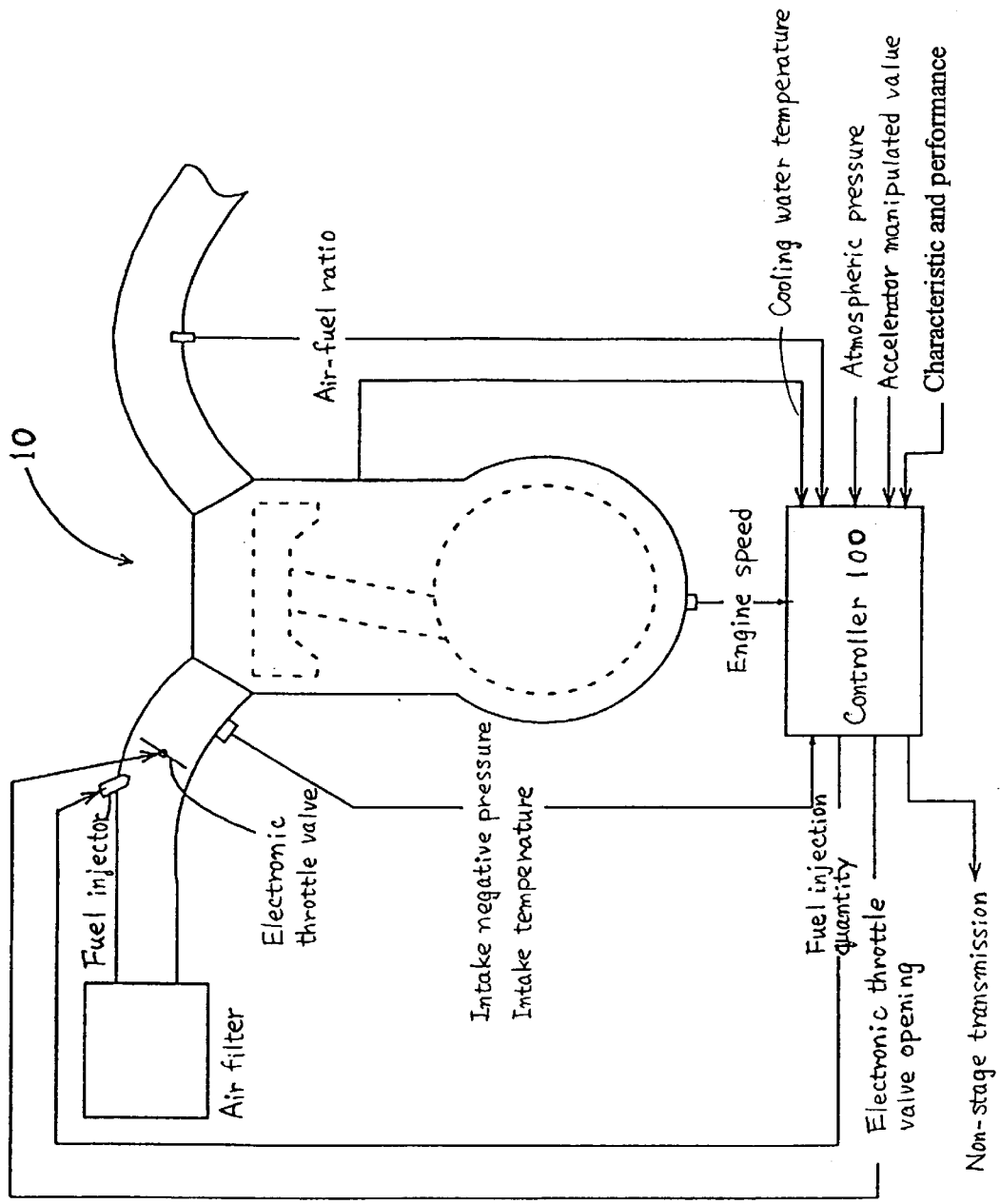
FIG. 2 is a schematic view showing a relationship between an internal combustion engine and a control device that defines an apparatus optimizing overall characteristics.

FIG. 2 is a schematic view showing a relationship between an engine 10 and a control device 100 that defines an apparatus optimizing overall characteristics.

The controller 100 is constructed so that fuel performance can be improved, obtaining desired drivability. Herein "drivability performance" means output performance of an engine in response to a throttle operation. As shown in the figure, the controller 100 receives as inputs information of engine speed, intake negative pressure, accelerator manipulated value, atmospheric pressure, intake temperature, and cooling water temperature. Based on the input information, it manipulates a fuel injector and an electronic throttle valve, and controls fuel injection quantity and intake atmosphere quantity, which leads to optimum control of drivability performance and fuel performance.

Figure 3:
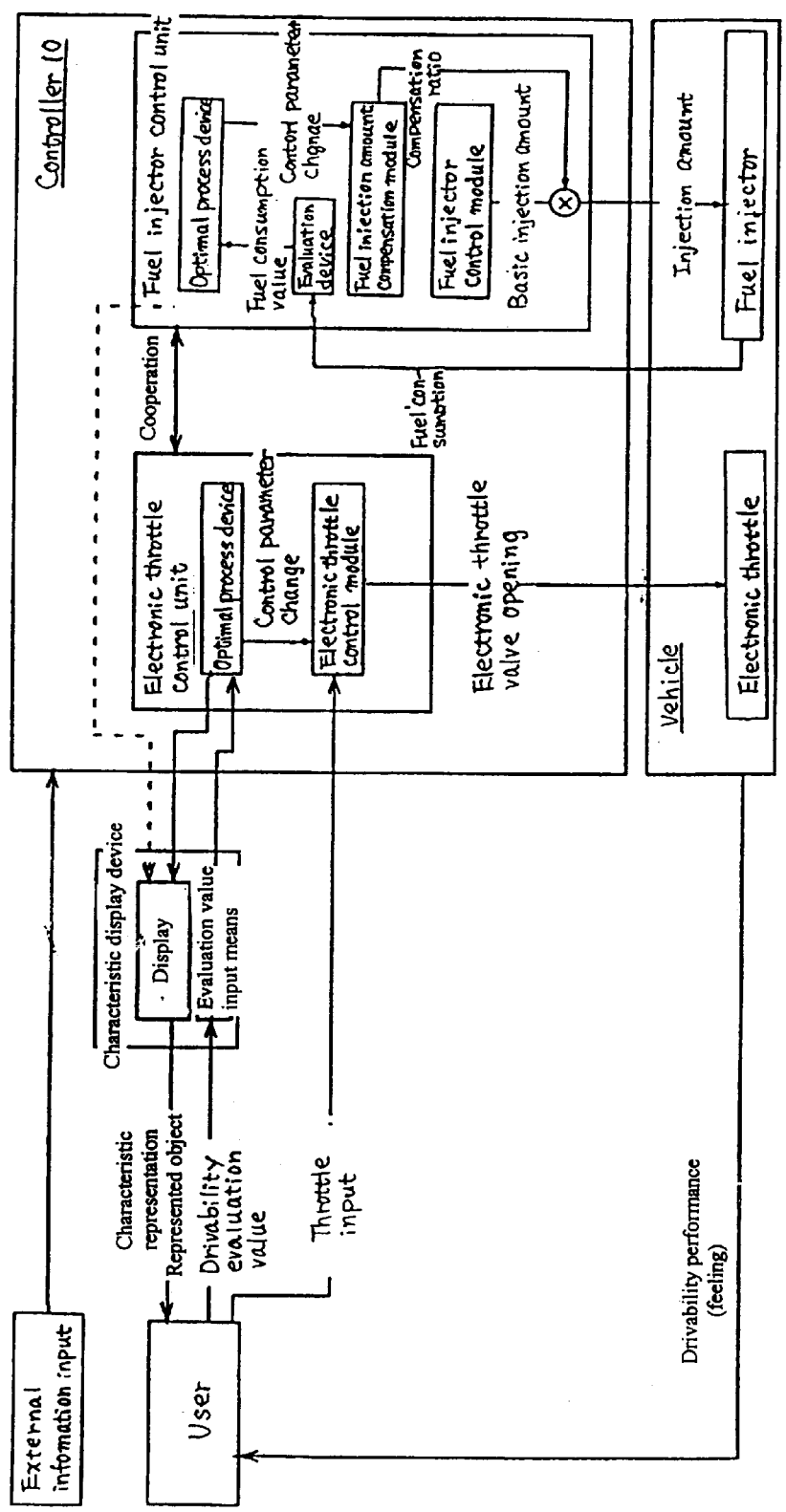
FIG. 3 is a block diagram of the control device.

FIG. 3 is a block diagram of the controller 100. As shown in the figure, the controller 100 comprises an electronic throttle control unit, a fuel injector control unit, and a characteristic display unit . The electronic throttle control unit includes an electronic throttle control module that determines an opening of an electronic throttle valve based on predetermined input information, and an optimal process device that optimizes control parameters of the electronic throttle control module.

The fuel injector control unit includes a fuel injector control module that determines a basic fuel injection amount based on predetermined input information (an external information input in FIG. 3), a fuel injection amount compensation module that determines a compensation ratio to the basic fuel injection amount, an optimal process device that optimizes the compensation module, and an evaluation device that evaluates the optimal process device.

Figure 4:
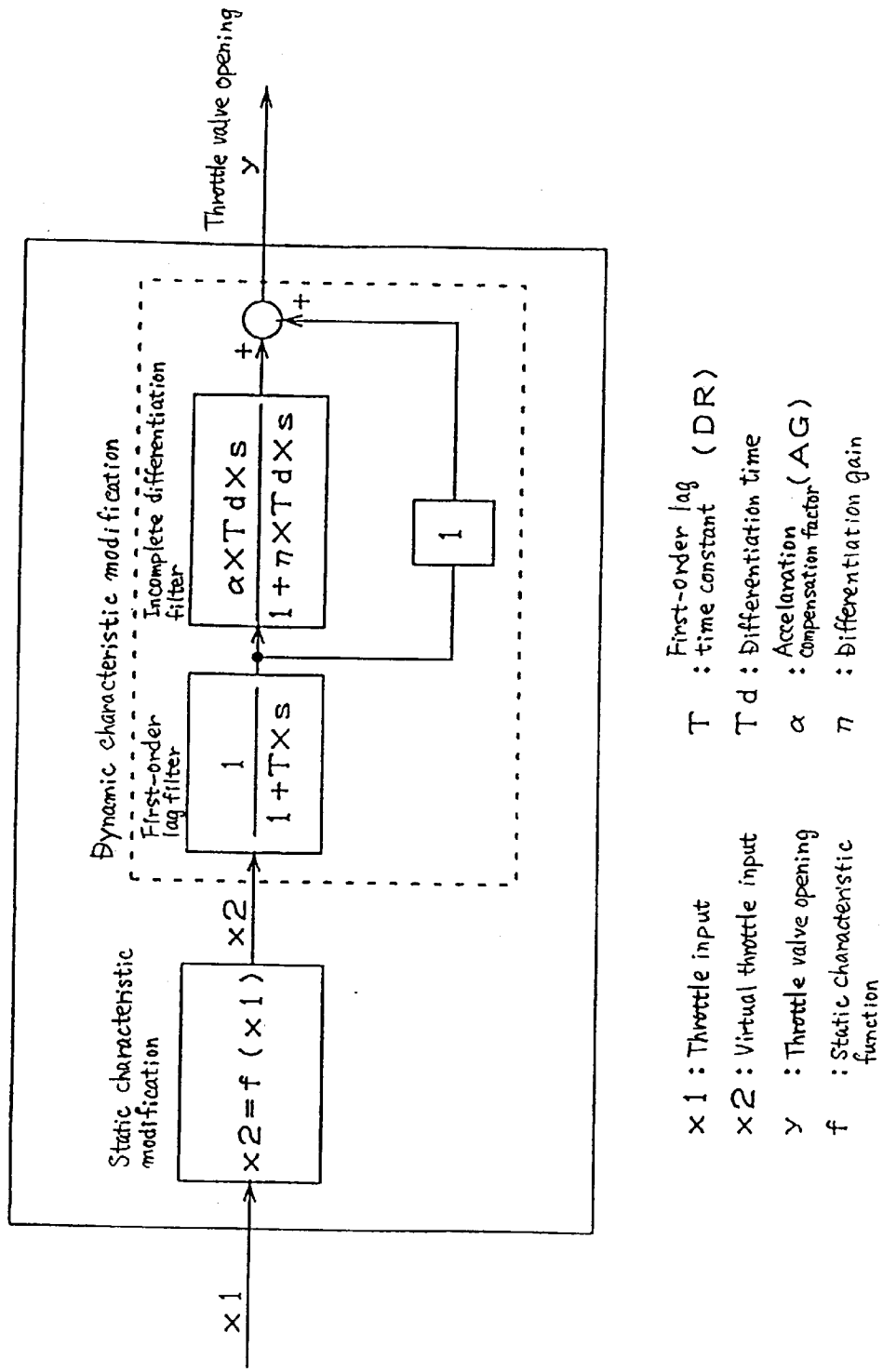
FIG. 4 is a block diagram of an electronic throttle control module.

FIG. 4 shows that the electronic throttle control module determines an opening of the electronic throttle valve based on an acceleration manipulated amount by a user. Herein the "acceleration manipulated amount" means information of both "an acceleration angle" and "an acceleration variable". The electronic throttle valve has two characteristics: static and dynamic. The former is the one derived from the relationship between the acceleration angle and the electronic throttle valve, which affects stationary running characteristics.

Figure 5A:
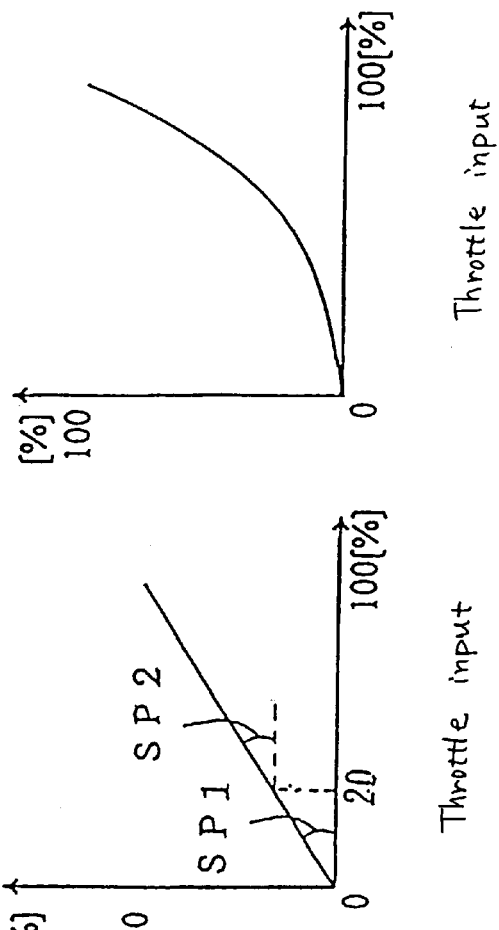
FIGS. 5a, 5b, and 5c are graphical views showing three exemplary static characteristics of throttle operational amounts versus throttle valve openings. The graph on the left-hand side shows the static characteristic that gives a quick acceleration at a relatively small opening. The graph at the middle position shows the static characteristic at a relatively small opening. The graph on the right hand side shows the static characteristic that gives a quick acceleration at a relatively large opening.
Figure 5B:
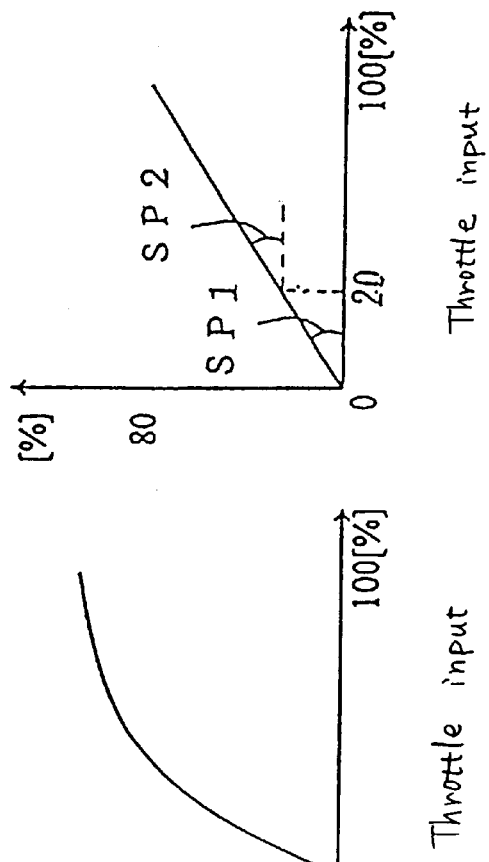
Figure 5C:
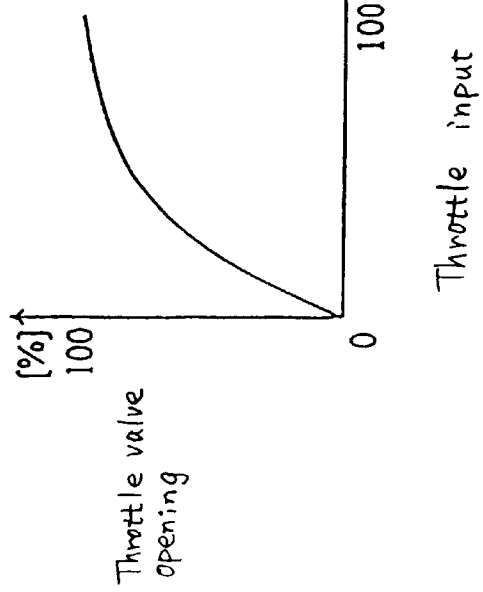

FIG. 5 contains graphs illustrating static characteristics of various throttle responses. There are three types of static characteristics: a low-opening sudden-acceleration type in which the electronic throttle valve opening is relatively large when an acceleration angle is small, and it opens gradually to the fully open position as the acceleration angle increases further (FIG. 5a); a high-opening sudden-acceleration type in which the electronic throttle valve opens gradually while the acceleration angle is small, and then opens suddenly to the fully open position when the acceleration angle is increased (FIG. 5c); and a linear type in which the acceleration angle is proportional to the throttle opening (FIG. 5b). In this way, the same acceleration angle produces different throttle openings. These static characteristics should demonstrate that as the acceleration angle gets bigger, the throttle opening increases or is constant, which allows different kinds of functions. In one embodiment, the static characteristic is optimized by optimizing throttle valve opening ratio SP1 when throttle opening is 0–20% and throttle valve opening ratio SP2 when throttle opening is 20–100%.

Figure 6:
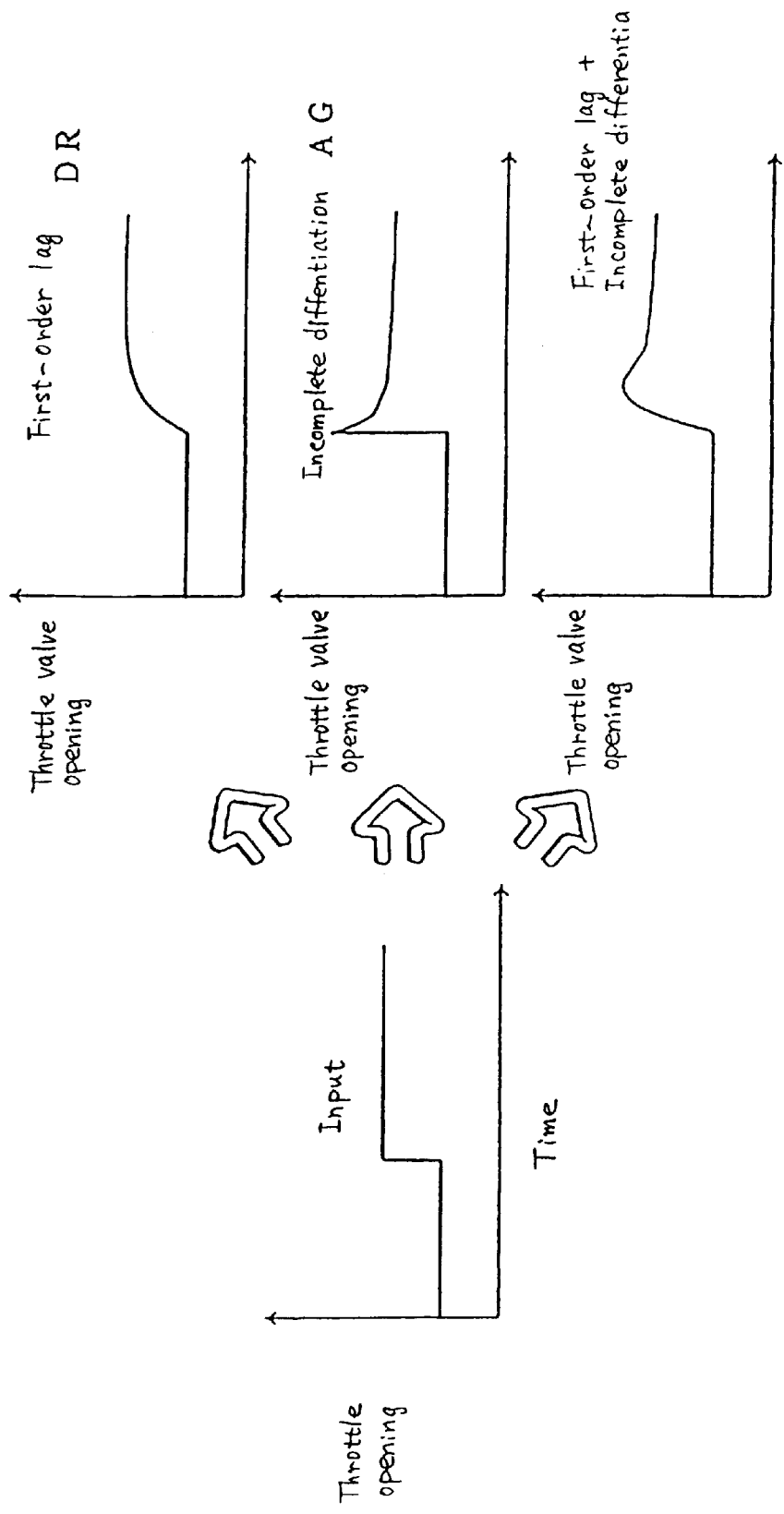
FIG. 6 is a graphical view showing some exemplary dynamic characteristics of throttle operational amounts versus throttle valve openings. The graph on the left-hand side shows an input form and three graphs on the right-hand side show output forms of the respective dynamic characteristics.

FIG. 6 shows a dynamic characteristic of various throttle responses. The dynamic characteristic is that derived from changed speeds of the throttle valve to changed speeds of the accelerator, which affects a transient characteristic of a vehicle. To be specific, the characteristic represents changed speeds of the throttle to changed speeds of the accelerator in a combination of first-order lag and incomplete differentiation. As shown in the figure, in a combination of first-order lag and incomplete differentiation, there are provided three types: the low-response type which shows that the throttle opens relatively slowly in response to acceleration manipulation; the high-response type which shows that although some spikes are produced in response to acceleration manipulation, the throttle responds fast and opens; and the type between the aforementioned two types. In this way, different types of dynamic characteristic are obtained. In the embodiment, the dynamic characteristic is optimized by optimizing first-order lag time constant DR and acceleration compensation factor AG.

Figure 7:
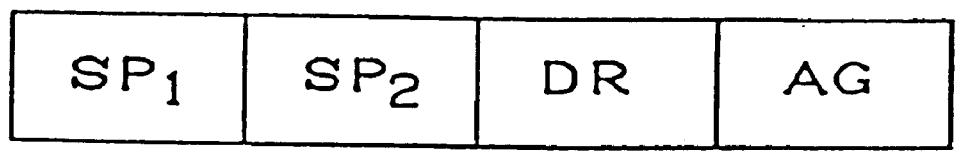
FIG. 7 is a diagrammatic view showing an exemplary cording of control parameters in the electronic throttle control module.

FIG. 7 shows coding of the control parameters of the electronic throttle control module. For example, the optimal process device in the electronic throttle control unit (see FIG. 3) employs an evolutionary calculation method and codes as one individual, the control parameters (throttle valve opening ratios SP1 and SP2, first-order lag time constant DR, and acceleration compensation factor AG) which are to be optimized using an evolutionary calculation method. Evaluation of the value of each control parameter during optimal process is conducted based on drivability performance a user feels in a real situation. As a result, each of the control parameters is optimized according to the user's evaluation, which in turn produce the optimum characteristic of the electronic throttle (drivability characteristic) the user desires.

The method by which the user conducts the evaluation in optimum process is called interactive evaluation herein. In the embodiment, the one individual comprises a combination of a static characteristic and a dynamic characteristic, so as to optimize the entire combination. However, other means may be used:

1. An operator sets a static characteristic beforehand and optimizes a dynamic characteristic only.
2. A static characteristic and a dynamic characteristic are optimized independently and individually.
3. A static characteristic is evolved first and then fixed; a dynamic characteristic is optimized.

Figure 8:
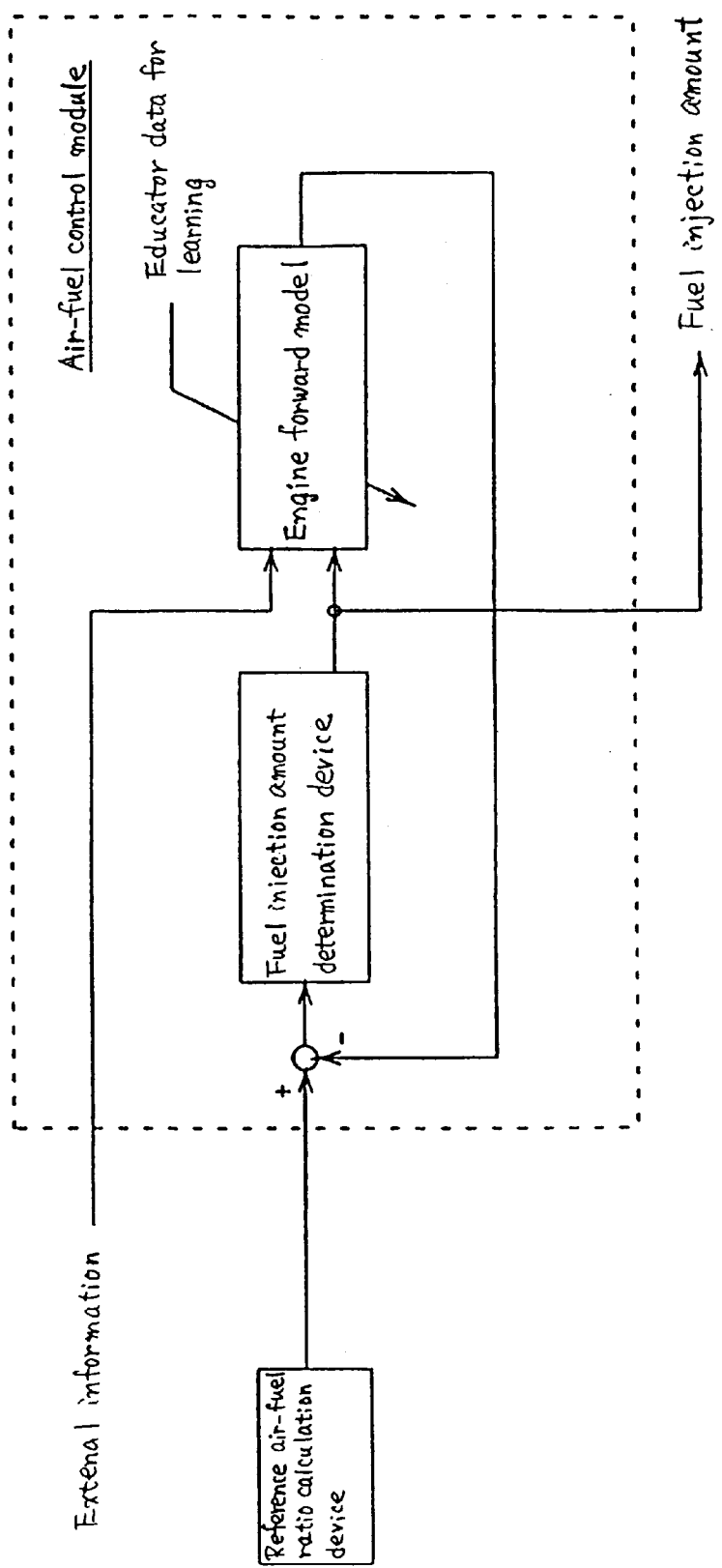
FIG. 8 is a block diagram showing a fuel injection device control module.

FIG. 8 shows a block diagram of the fuel injector control module. The fuel injector control module includes an engine forward model, which is modeled using a feedforward control logic with learning function, and a fuel injection amount determination device, which determines a basic injection amount of the fuel injector based on an output of the engine forward model and a reference air-fuel ratio. The reference air-fuel ratio is calculated based on an engine speed and an throttle opening by a reference air-fuel ratio calculation device.

Figure 9A:
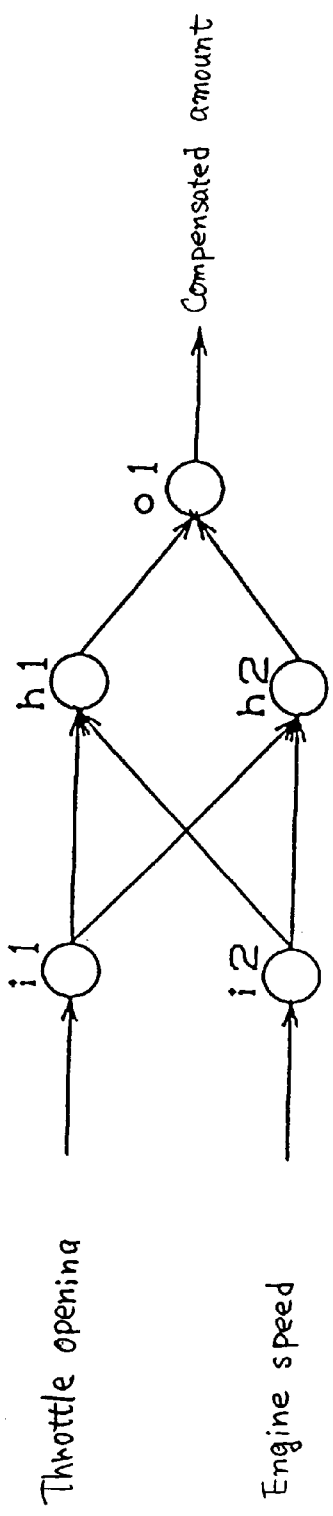
FIG. 9a is a schematic diagram of a neural network that forms a fuel injection amount adjusting control module.

FIG. 9a shows a neural network that may be used for the fuel injection amount compensation module. The fuel injection amount compensation module consists of a neural network in which a throttle opening and an engine speed are inputs and a compensated amount is an output. As illustrated in FIG. 3, the compensated amount is multiplied by the basic fuel injection amount output at the fuel injector control module to obtain a final fuel injection amount.

Figure 9B:
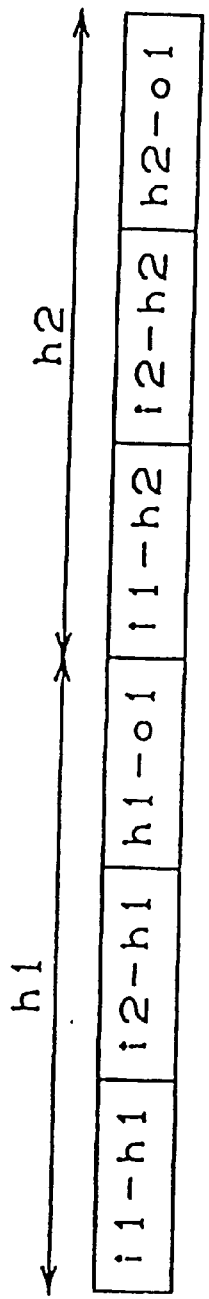
FIG. 9b is a diagrammatic view showing an exemplary cording of control parameters in the fuel injection control module.

FIG. 9b shows encoding of the control parameters of the fuel injection control module. The optimal process device in the fuel injector control unit employs as optimal operation, for example, an evolutionary calculation method, encodes the coupling coefficients of the neural network constituting the fuel injection amount compensation module to produce individuals, and optimizes the coefficients (control parameters) using the evolutionary calculation method.

Evaluation of the value of each control parameter during optimal process is made by an evaluation device in which the desired fuel consumption is set. As a result, the coupling coefficients (control parameters) for the fuel injection amount compensation module are optimized automatically toward the desired fuel consumption, which provides an optimal fuel consumption characteristic. In this way, the method through which evaluation in optimal operation is done by the evaluation device designed beforehand and optimization is conducted automatically is called an automatic evaluation.

Optimization processes in the above-described electronic throttle control section and the fuel injection device control section will now be described.

Figure 10:
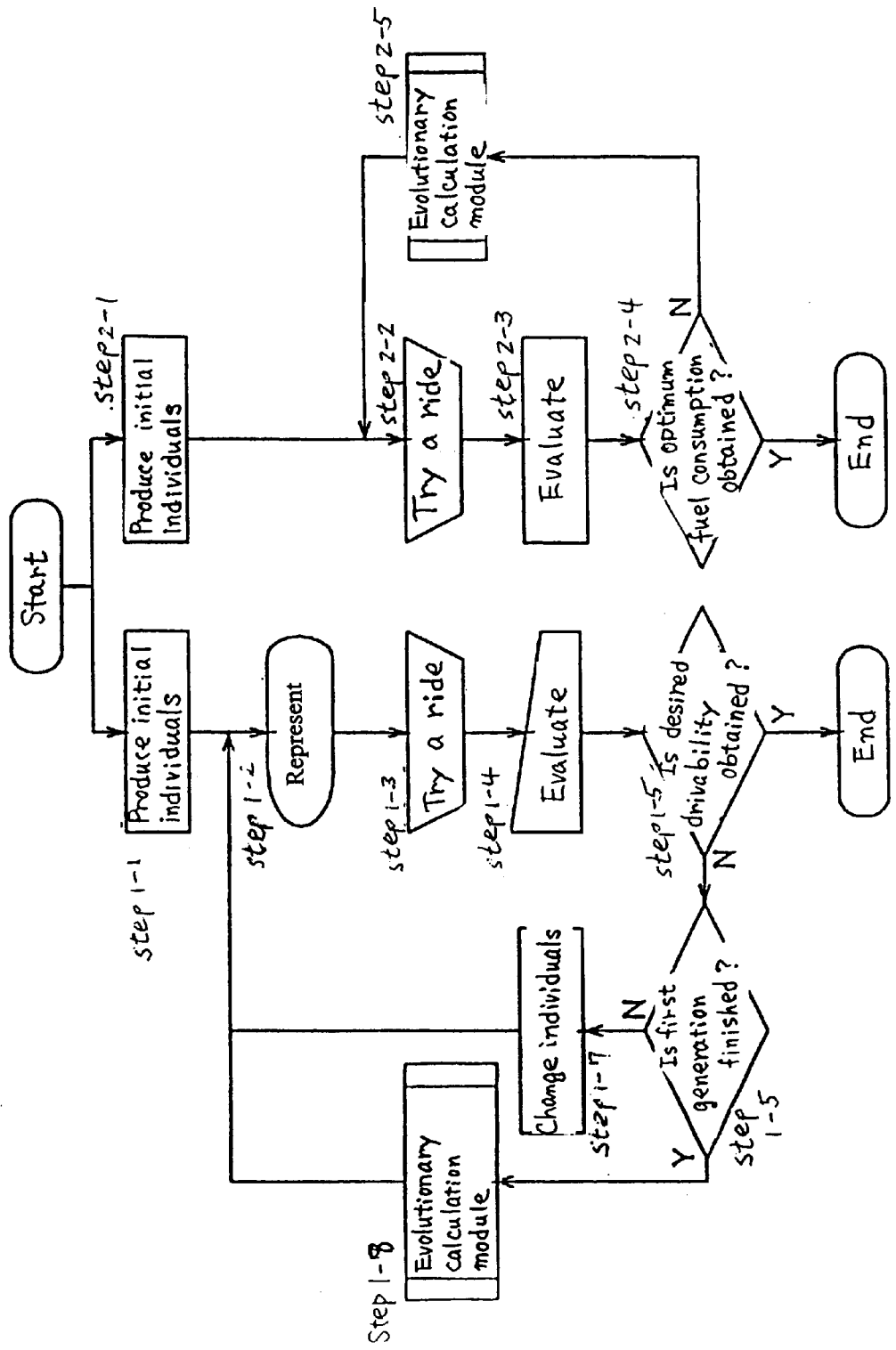
FIG. 10 is a sequential chart showing an entire routine for optimizing of the control device.

FIG. 10 illustrates a sequential chart of an entire routine for optimizing of the control device 100.

As described above, the control device 100 employs the dialog-type evaluation in the electronic throttle control section and the autonomy-type evaluation in the fuel injection device control section for the optimization processes. Different evaluation methods have different optimization processes. Thus, the respective optimization processes employing the dialog-type evaluation method and the autonomy-type evaluation method will be separately described below.

a. Optimal Process in the Fuel Injector Control Unit (Autonomy-Type Evaluation)

As shown in step 2-1 of FIG. 10, the initial values of the control parameters (in the fuel injection amount compensation module shown in FIG. 3 are given for optimizing the control modules which are an optimal subject in each control unit, which are initially random within a predetermined range. A first generation comprising a plurality of initial individuals are produced in step 2-1. And fuel consumption of all the individuals in the first generation is calculated (step 2-2). The calculation of fuel consumption is explained below. With regard to the fuel injection control evolution module, a plurality of individuals are worked falsely and in parallel by time division, and evaluation values derived from a total of the duration are compared.

Figure 11:
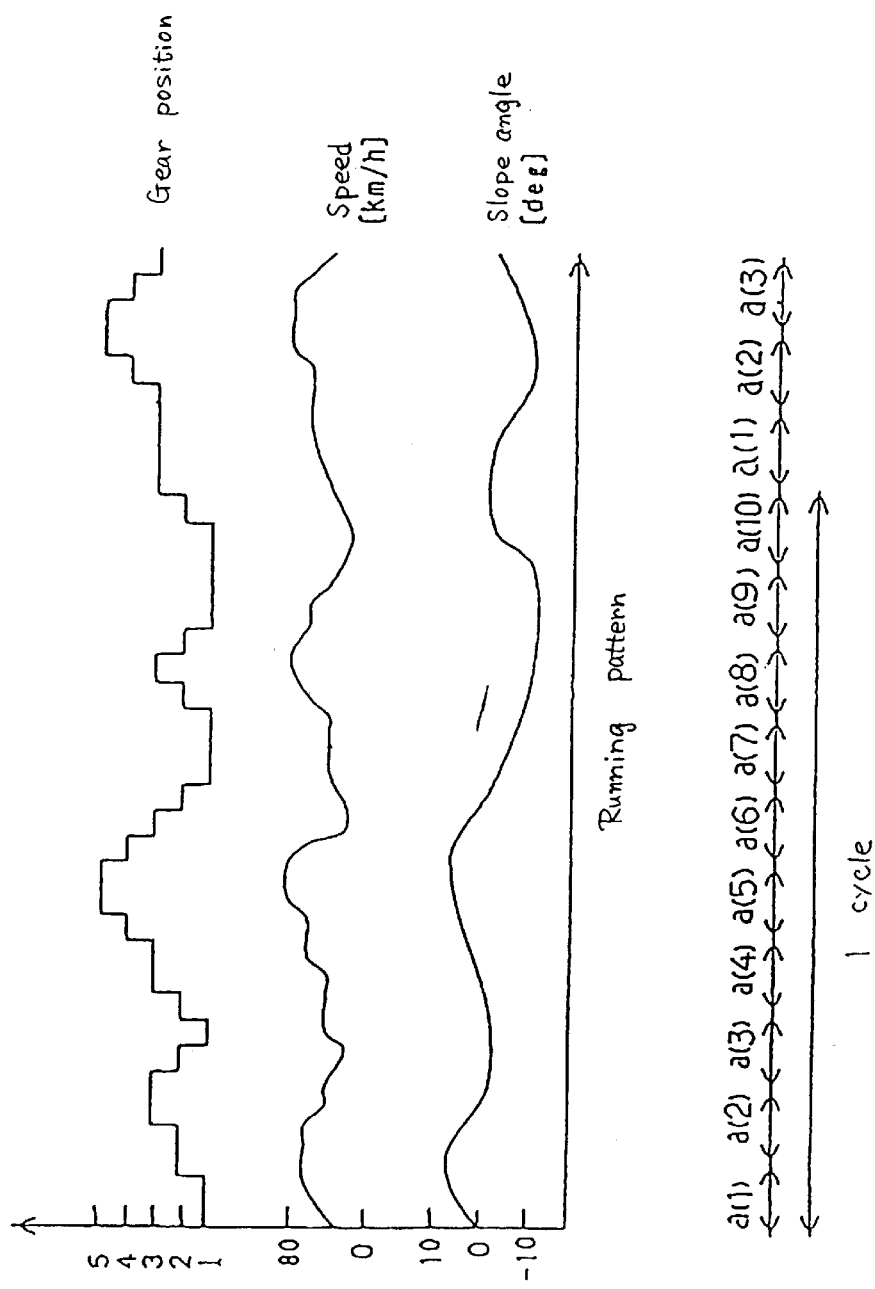
FIG. 11 is an exemplary method by which respective individuals are evaluated during shared periods of time.

FIG. 11 is a diagram illustrating one example of division methods that evaluates each individual by time-division. To be specific about the comparison of evaluation values, for example, as shown in FIG. 11, ten individuals are controlled for one minute each, and with this as one cycle, twenty cycles are repeated. The total running length for a evaluation period is divided by fuel consumption amount to get fuel consumption, i.e., evaluation value. This allows determination of the influence by a gear position difference and a slope angle as a total, which allows a fair evaluation of the characteristic of each individual.

Based on the fuel consumption for the individual (namely, the evaluation value), as derived from the fuel consumption calculation process (step 2-2), it is judged whether an optimal fuel consumption characteristic has been obtained (step 2-3). As a result of the evaluation, it is determined whether optimal fuel consumption is obtained (step 2-4). If it is, the optimal process is ended; if not, the evolutionary calculation module begins (step 2-5) to produce a group of individuals for a next generation.

b. The Optimization Process in the Electronic Throttle Control Section (Dialog-Type Evaluation)

As seen in FIG. 10, at first and in the step 1-1, the program determines at random the initial values of the control parameters (if in the electronic throttle control module, static characteristics SP1 and SP2, dynamic characteristics DR and AG, while if in the transmission ratio adjusting module, coupling coefficients of a neural network that forms the transmission ratio adjusting module) of the control module in the electronic throttle control section within a preset range. In this regard, the control parameters require optimization. Then, a first generation formed with a plurality of initial individuals.

The program goes to the step 1-2 and changes overall characteristics that are obtained by combining throttle characteristics based upon the respective parameters of individuals to fish patterns that imitate fishes that have similar characteristics and indicates the fish patterns on the characteristic display device as assistance information for evaluation.

Display Device Adapted for Engine

Figure 12:
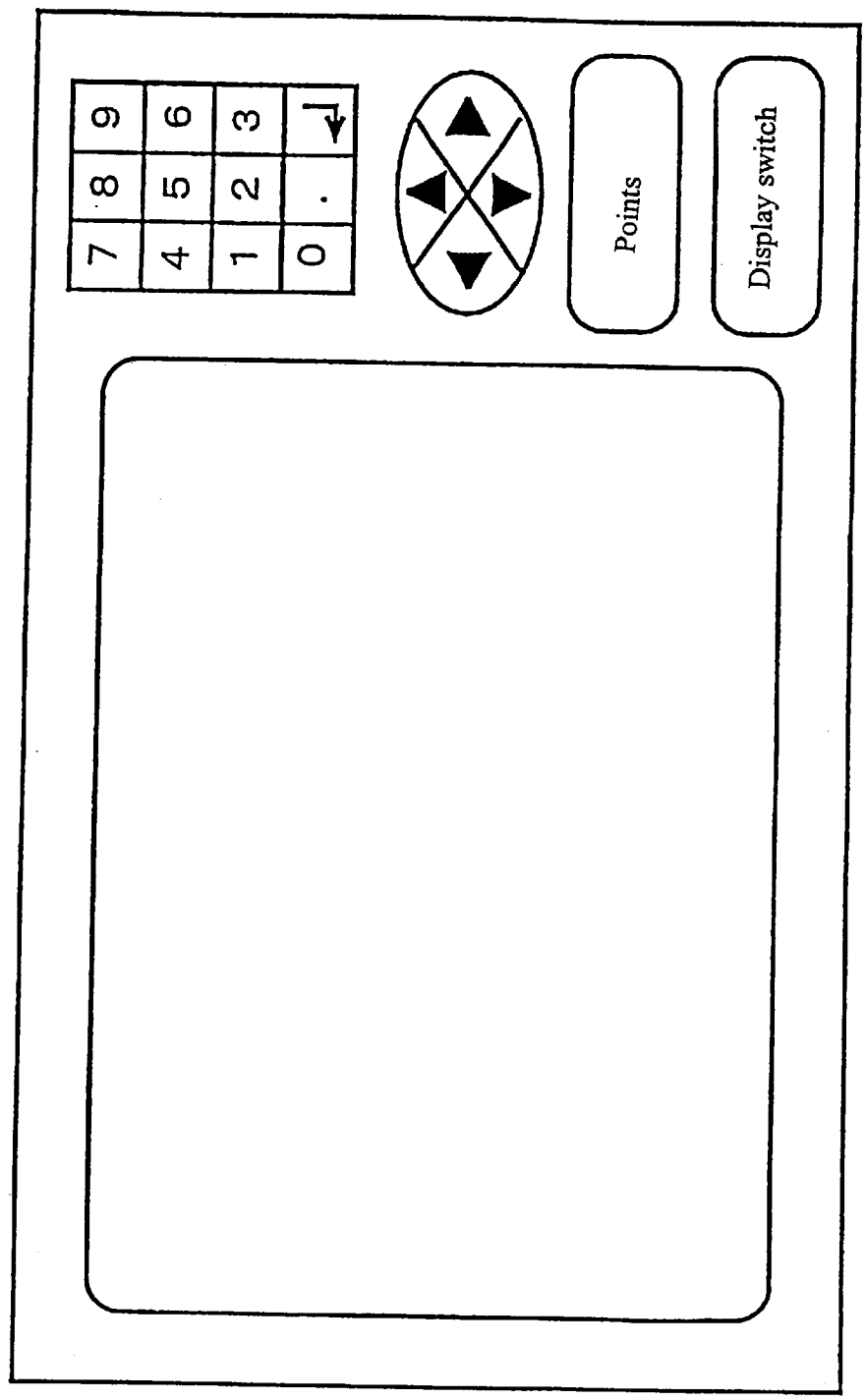
FIG. 12 is a schematic view showing a display for displaying characteristics.
Figure 13A:
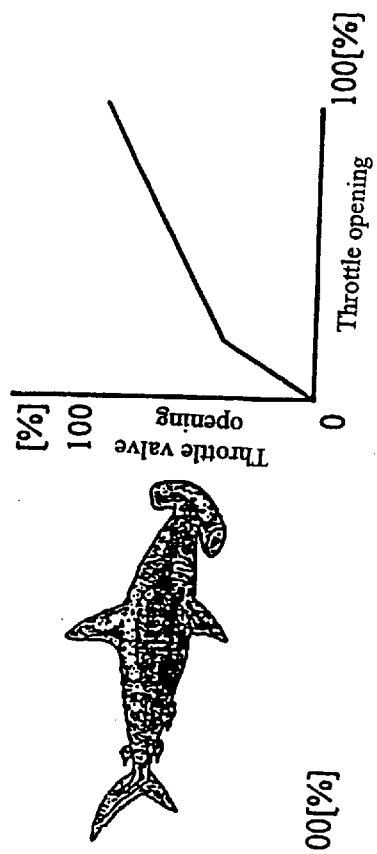
FIGS. 13a, 13b, 13c, and 13d are schematic views showing exemplary correspondences between static characteristics and fish patterns.
Figure 13B:
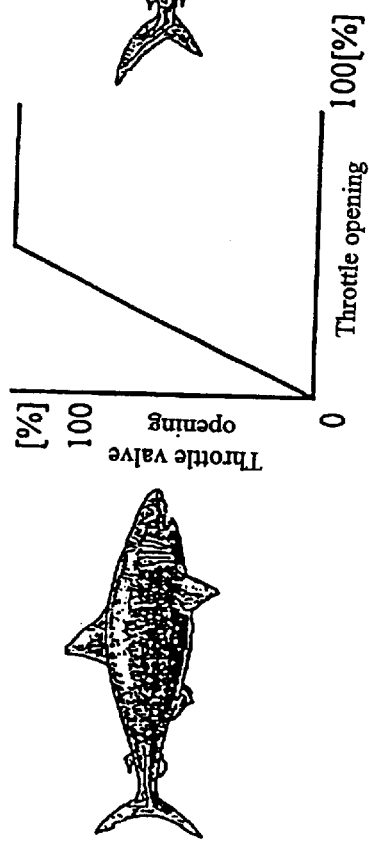
Figure 13C:
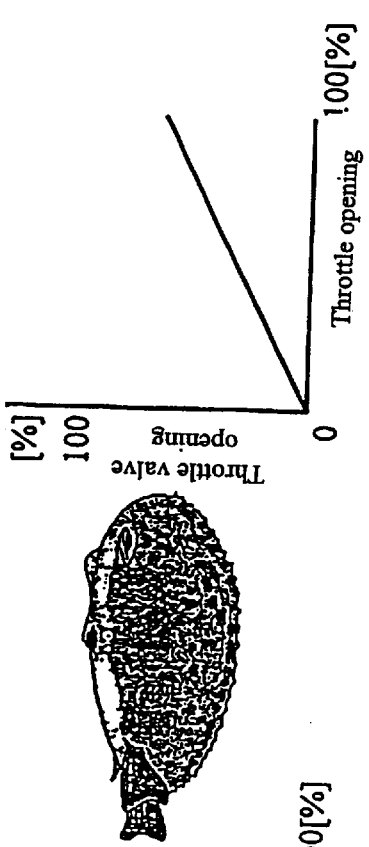
Figure 13D:
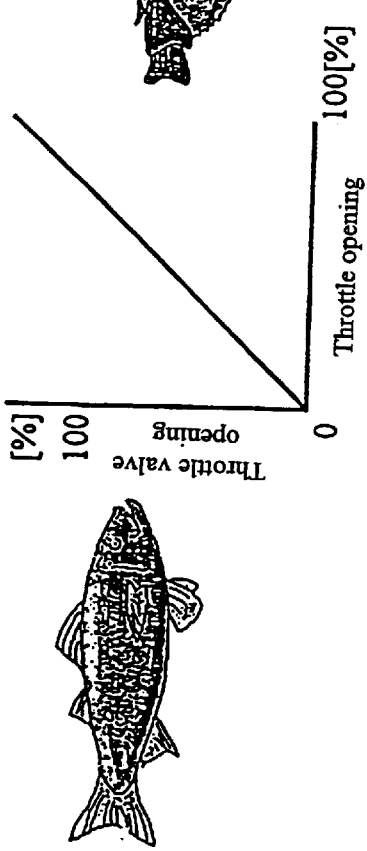

Before discussing the remaining steps in the optimization process of the electronic throttle control section, the characteristic display device will be described. FIG. 12 illustrates a schematic view of the characteristic display device. As seen in the figure, the display device includes a man-machine interface that comprises a display indicating the fish patterns and evaluation input elements operable by the user. The display device changes the overall characteristics obtained by combining throttle characteristics based upon the respective individuals in the evolution processes to patterns the user can recognize similarity to the characteristics (specifically, fish patterns that imitate fishes that have similar characteristics are used) and indicates the fish patterns as assistance information for evaluation.

Specifically, the overall throttle characteristics will be obtained if the throttle characteristic vector s is given as $$s=[SP1\ SP2\ DR\ AG]^T$$

and through the following linear conversion;

$$As=f$$

where, $$A = \begin{bmatrix} 1 & 0 & 0 & 0 \\ 0 & 1 & 0 & 0 \\ 0 & 0 & 1 & -1 \end{bmatrix}$$

As a result, the following overall throttle characteristics will be obtained;

$$f=[SP1\ SP2\ DR-AG]^T$$

Since the static characteristics SP1 and SP2 relate to a generous drive feeling, the combination of the static characteristics SP1 and SP2 are linked to species of fish. Meanwhile, since the dynamic characteristic DR-AG relates to responses, the dynamic characteristic DR-AG is linked to the shape of the fishes.

FIG. 13 illustrates specific fish patters in connection with the static characteristics. As seen in this figure, if both of SP1 and SP2 are large, a mere small throttle operational amount may make the throttle valve open completely. This characteristic is shown with a shark that is known as a fierce fish. If both of SP1 and SP2 are small, the throttle valve can slightly open even though the throttle operational amount is fully given. This characteristic is linked to a blowfish that is known as a tranquil fish.

Figure 14:
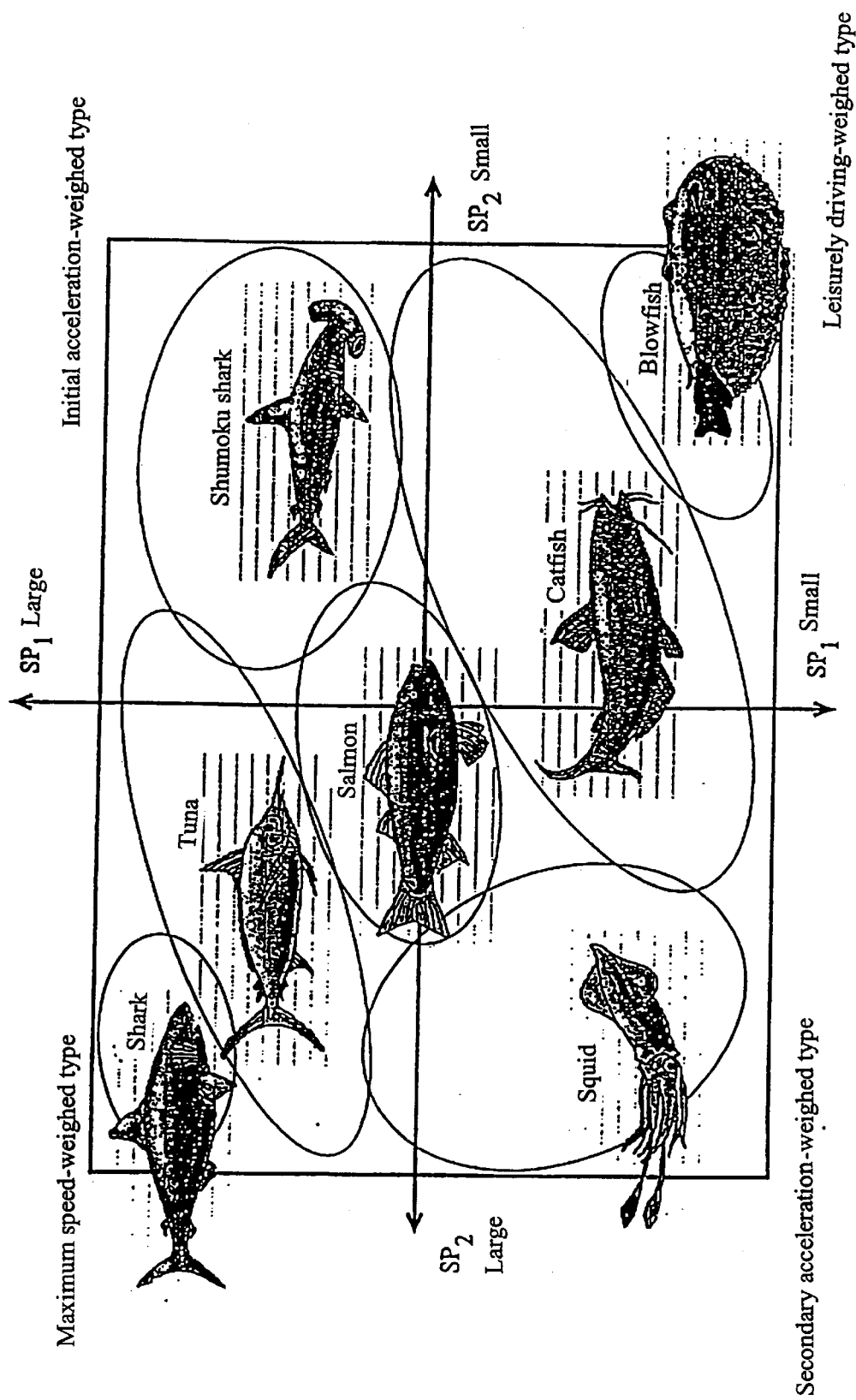
FIG. 14 is a schematic view showing an exemplary two-dimensional map formed with the static characteristics (SP1 and SP2) in which the corresponding fish patterns are indicated.

FIG. 14 illustrates an image map in which fish patterns are linked to and shown in a two-dimensional space that is constructed with SP1 and SP2.

Figure 15:
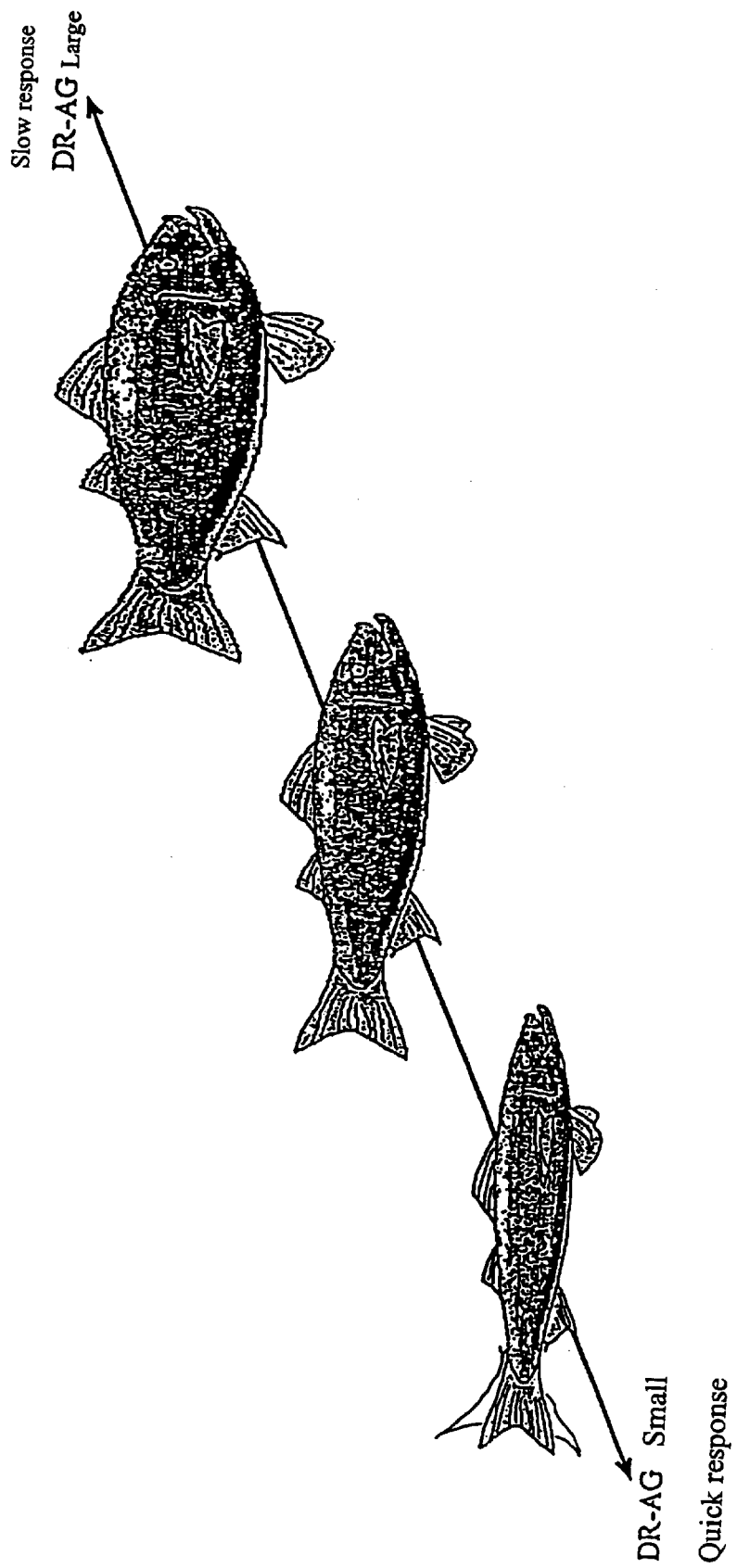
FIG. 15 is a schematic view showing an exemplary map formed with the dynamic characteristics (DR-AG) in which the corresponding fish patterns are indicated.

Also, FIG. 15 illustrates linkages between the dynamic characteristics and body forms of fishes because responses vary with changes of DR-AG. That is, the smaller the DR-AG is, the sharper the response is. If the DR-AG is small, a slender figure is shown so that the user can intuitively recognize the linkage. If the DR-AG is large, a fat figure is given to the user so that he or she can intuitively have an impression of slowness.

One idea is to show only fish patterns that correspond to characteristics of individuals that are used for a test ride. As seen in FIG. 16, however, it is more preferable to sow both of entire individuals of one generation (five individuals in this embodiment) and an individual that is used for a test ride. Because, thereby, the user can recognize more clearly the convergence state and evolutionary flow. In the figure, the fish patterns that are lined vertically at the left-hand side in the display show the entire i individuals of one generation, while the large fish that is indicated in the right-hand therein is the individual that is used for the test ride. The display also makes it easy to compare one individual to another one. With reference to the display, therefore, an undesirable individual can be immediately discarded without having a test ride. This quick reference expedites the evolutionary learning accordingly.

More specifically, FIGS. 16 (a) to (c) illustrate an example from an initial state to a terminal state of the evolutionary processes. As seen in these figures, at the initial state, various fishes are shown. However, with progression of the evolutionary processes, species of the fishes are reduced because the individuals evolve to have more preferable characteristics than before. At last, only one fish remains and the display simply show a variety of its body forms.

It is also practicable to store parent individuals that are selected in the respective generations during the evolutionary processes and then, if necessary, to recall some of them to show what processes makes the current characteristic from the initial characteristics as a kind of lineage chart.

Returning back to FIG. 10, the remaining steps of the optimization process of the electronic throttle control section will be described.

After showing the fish patterns in the characteristic display device at the step 1-2, the program expects that the user has a test ride by using one or more individuals of the first generation at the step 1-3. The user, hence, makes the test ride and inputs his or her evaluation upon the individuals at the step 1-4. As described above, the characteristics obtained from the respective individuals in the evolutionary processes are shown in the characteristic display device by using the fish patterns linked to the throttle characteristics. Accordingly, the user can input his or her evaluation values on the respective individuals based upon his or her bodily sensation with reference to the fish patterns shown in the display device by the input elements, i.e., buttons that are positioned at right-hand side of the display screen in this embodiment.

Specifically, the evaluation values can be determined in proportion to the period of time in which the user continuously pushes the bottom. The evaluation value will be, for example, calculated by multiplying a preset coefficient to the reciprocal number of the time period or by employing fuzzy rules. Thereby, even if the evaluation by the user has fuzziness, the evaluation values can have certain accuracy and allows the user to apply the evolutionary method in such a dialog style. In addition, if the user continuously pushes the button beyond a preset time, the program can skip the individual under evaluation to the next individual at the moment. Thereby, the user can immediately discard the undesirable individual and the evolution can be expedited. The individuals are preferably exchanged when the vehicle is at a standstill to avoid influences due to abrupt changes of the throttle characteristics under running conditions.

Next, the program goes to the step 1-5 to determine if the vehicle has obtained a desirable drivability or acceleration performance. If this is positive, the program finishes the sequential routine. If this is negative, the program goes to the step 1-6 to determine whether the test ride and evaluation have been completed through the entire individuals of the generation. If this is denied, the program goes to the step 1-7 to exchange the parameters of the individual to parameters of another individual in the control module and repeat another test ride at the step 1-3 and also another evaluation at the step 1-4. If all of the test rides and evaluations upon the entire individuals are finished, the program goes to the step 1-8 to transfer to an evolution-type calculation module and then produce individuals of the next generation. Then, the parameters of these individuals will be employed for further test rides and evaluations.

The processes are repeated until a desirable drivability or acceleration performance is obtained. As a result, the parameters of the electronic throttle control module and the transmission adjustment ratio module can be optimized.

The evolution-type calculation module that is employed for the respective optimization processes will be described by citing a genetic algorithm as an instance.

Figure 17:
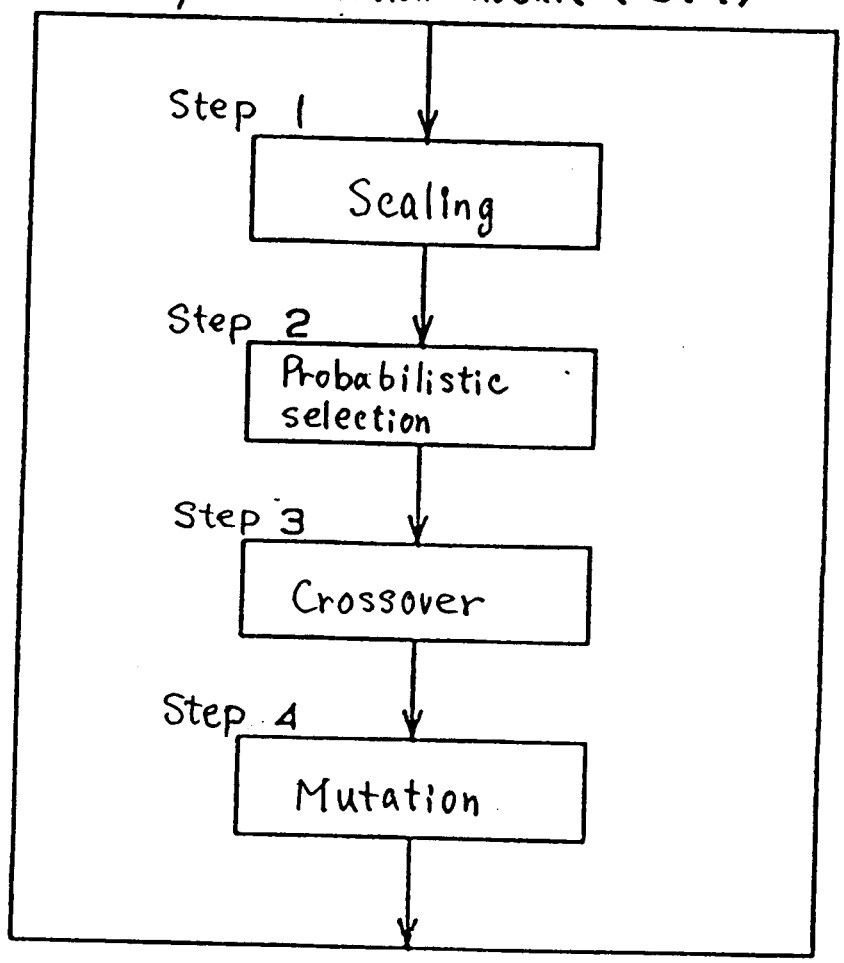
FIG. 17 is a sequential chart showing an evolution-type calculation module that uses a genetic algorithm as an evolution-type calculation method.

FIG. 17 is a flowchart illustrating an evolutionary calculation module that uses a hereditary algorithm as a evolutionary calculation method. After completing evaluation of all the individuals of the first generation, the module produces a group of individuals for a next generation when the desired characteristic is not obtained.

With regard to scaling (step 1), linear transformation of adaptability is performed so that the ratio of maximum adaptability to average adaptability in an individual group can be constant.

With regard to selecting (step 2), a roulette selecting system may be employed that selects probabilistically proportional to the user's evaluation value (adaptability). a tournament selecting system may also be used which selects the individual with the best evaluation value among n randomly selected individuals.

With regard to crossing over (step 3), there are systems which use one point crossing over, two point crossing over, and normal distribution crossing over. A selected crossing-over parent happens to be the same individual, but if this situation is left, versatility as an individual group will be lost. On the ground of this, when a parent selected at crossing over is the same individual, another selected individual should be replaced to avoid the crossing over of the same individual as much as possible.

With regard to mutating (step 4), value of each gene of individuals is changed randomly at a predetermined probability. There is another method which adds perturbation following a normal distribution. In spite of the fact that different individuals are selected as crossing-over parents, when they are quite the same in terms of heredity, mutation for both of the crossing-over parents is produced with a higher probability than usual.

Other than the methods mentioned above, there can be employed a generation change method called "regeneration" that replaces all the individuals of one generation at one time. When strictly applying to generation change, there is a possibility that a individual with high evaluation will be destroyed. Therefore, the strategy should be used that the elite (individuals with high evaluation) are left unconditionally to a next generation, or the elite are preserved.

Other Applications

As described above, in the illustrated embodiment, the changes of the characteristics that should be evaluated by the user are shown as indications such as fish patterns that can be identified as having similar dispositions in the characteristic display device in the optimization process of the throttle characteristics of the electronic throttle. The user, by the indications, can intuitively recognize the relationships between the indications and the characteristics. Therefore, by watching the indications, the user can easily evaluate characteristics that are difficult to distinguish based only on his or her bodily sensations. This method may remove the burden for the user of reading through an operating manual or instruction book to understand the relationships between the characteristics and the indications. In addition, the method reduces the possibility that the evolution goes to an undesirable direction due to the user's misunderstanding in the evolutionary processes.

Preferably, the characteristic display device is so disposed that the user can watch it while operating the vehicle. If disposed like this, the display may be constructed to provide both of the above-noted indications and other indication of information such as a vehicle speed or engine speed on the same screen by switching over them or simultaneously.

In the illustrated embodiment, characteristics of respective individuals and a characteristic of the individual that is used for a test ride are shown in the characteristic display device after the individuals are produced and before the test ride. However, the display is not necessarily given at this moment. Any timing, such as after the test ride, can be used.

Also, the characteristic display device only shows characteristics in the electronic throttle control section that employs the dialog-type evaluation. However, it is applicable to show characteristics in the fuel injection device control section that employs the autonomy-type evaluation in a manner of a switchover from the above-described characteristics in the electronic throttle control section. When the user sees, in such a manner, what is going on in the optimization process that employs the autonomy-type evaluation, he or she can apparently recognize the current characteristic. Thus, it is also practicable that the user takes part in the optimization process employing the autonomy-type evaluation by, for example, changing an evaluation standard in case of need.

Furthermore, in the illustrated embodiment, the characteristic display device shows the static characteristics with species of fishes and the dynamic characteristics with body forms of the fishes. However, it is also applicable to show respective characteristics of multiple control modules in combination. That is, for example, additionally showing characteristics of the fuel efficiency with lengths (or sizes) of the fishes if necessary is a good idea.

Figure 18:
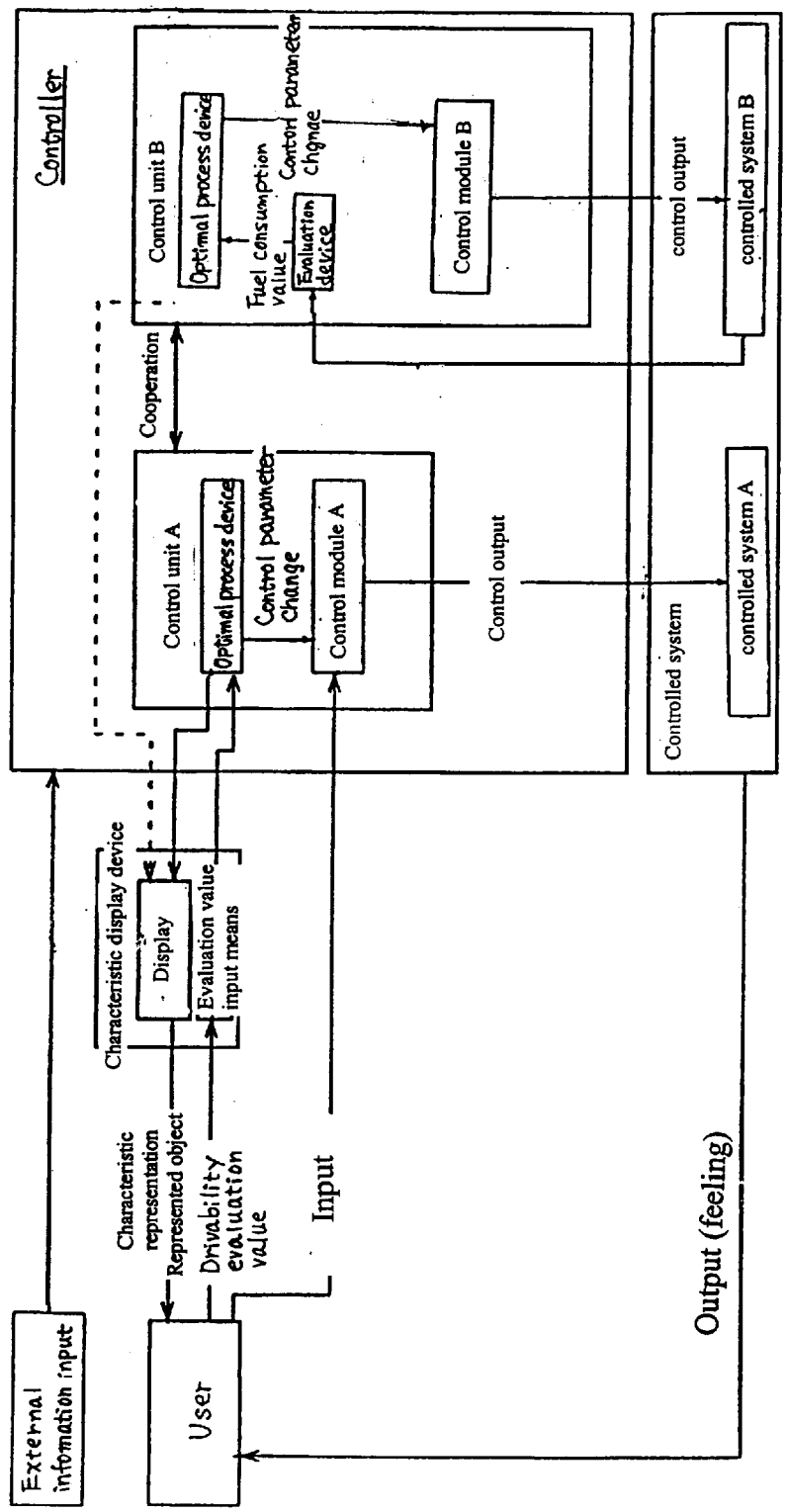
FIG. 18 is a block diagram showing a control device and a characteristic display device for optimization of characteristics of optional controlled subjects.

Moreover, the overall characteristic control method and apparatus in the illustrated embodiment is employed for the electronic throttle control. However, as seen in FIG. 18, the method and apparatus are applicable for any machines if they are controlled by control devices that have control parameters which characteristics are changeable. For instance, a sugar degree measurement device (a device for measuring sweetness of food) may employ the method and apparatus. The device can change parameters such as, for example, "tasty" and "not so tasty" that come from, for example, sweetness of fruit or its pH to something that the user may identify similarities to them, for example, indications that have human faces and present them as assistance information in a display. Thereby, the user can determine whether the food that he or her tries to eat is tasty or not tasty before actually eating them. Otherwise, the user may consult it in his or her determination of the food taste after eating. For instance, the user's evaluation after eating a fruit can help the sugar degree measurement device rectify the indication map (e.g., human faces) so that the user can evaluate the taste more correctly.

Still further, it is applicable to provide a unit that unifies the characteristic display device and the optimization process section and then make the unit detachable from the vehicle. Since the user can intuitively recognize the relationships between the characteristics and the indications on the display he or she can optimize the control parameters or simulate it in a certain direction of the optimization at his or her home without actually riding the vehicle. The optimization without rides on the vehicle not only expedites the optimization per se but also make it possible that the user can previously obtain characteristics that are suitable for weather or environment when and where he or she plans to go at home by using the overall characteristic optimization device. This is, in other words, to give a pleasure to the user that is a kind of amusement of breeding the vehicle or machine.

As described above, the overall characteristic optimization method in the illustrated embodiment relates to the optimization method in which control parameters of a control module that is applied for ordinary control and that determine outputs in connection with operational amounts of a machine based upon preset input information by using a manner with heuristics. The method provides the steps of linking the changes of the machine's characteristics obtained from the control parameters to species or changes of indications that can be identified as having similarity to the characteristics changes and showing the indications to the user. Thereby, the user can intuitively recognize the current characteristics and their changes in the process of optimization. In addition, if the evaluation of the optimization process is done based upon a preset evaluation standard, the user may enjoy the optimization process in a display. If, on the other hand, the evaluation is done by the user based upon his or her volition, he or she can easily do this with reference to the indication on the display and errors in the evaluation will be extremely reduced.

The indications that can be identified as having similarity to the characteristics include patterns that are made by imitating something already existing that users can identify what they are.

The above-noted something that users can identify includes organisms such as, for example, plants, fishes, birds, mammals or reptiles and even inorganic things such as, for example, rocks or buildings.

Additionally, in the present invention, correlations between various inputs and various outputs of the control modules can be determined using existing techniques such as neural networks, fuzzy neural networks, and genetic algorithms if the correlations are highly complex, or using existing techniques such as maps and functional equations if the correlations are rather simple. In this regard, Da Ruan (editor)"Intelligent Hybrid Systems—Fuzzy Logic, Neural Networks, and Genetic Algorithms—" Kluwer Academic Publishers (1997), J.-S. R. Jang, C.-T. Sun, E. Mizutani, "Neuro-Fuzzy and Soft Computing" Prentice Hall Upper Saddle River, NJ 07458 (1997), C.-T. Lin and C. S. George Lee, "Neural Fuzzy Systems" Prentice Hall Upper Saddle River, NJ 07458 (1998), and N. K. Kasabov, "Foundations of Neural Networks, Fuzzy Systems, and Knowledge Engineering" the MIT Press (1996) can be referred to. The above techniques can be combined, and learning control can be adapted for any techniques.

Further, in addition to genetic algorithms (GA), genetic programming (GP) or other evolutionary computing techniques can be adapted to the present invention (Wolfgang Banzhaf, et al. (editor), "Genetic Programming, An Introduction", pp. 363–377, 1999, Morgan Kaufnann Publishers, Inc., for example). These techniques are sometimes categorized as "heuristic control" which includes evolution, simulated annealing, and reinforcement learning method (S. Suzuki, et al., "Vision-Based Learning for Real Robot: Towards RoboCup", RoboCup—97 Workshop, 23, 24, and 29 August, 1997 Nagoya Congress Center, pp. 107–110; K. and Nurmela, et al., "Constructing Covering Designs By Simulated Annealing", pp. 4–7, Helsinki University of Technology, Digital Systems Laboratory, Technical Reports No. 10, January 1993, for example). These techniques can be adapted to the present invention without complication, based on the principle described earlier; that is, in the present invention, "evolutionary computing" includes the above various techniques.

In connection with the description above, the following items will be disclosed:

1) A method for optimizing overall characteristics in optimizing control parameters of an ordinary control module that determines an output associated with a manipulated variable of a controlled system in response to predetermined input information, using an optimization technique by heuristics so that characteristics of the controlled system can be optimized, the method comprising the steps of:

associating a change in the characteristics of the controlled system derived from the control parameters with a change or kind of representations that simulate identifiable objects; and replacing the characteristics of the controlled system derived from the control parameters during optimization process by the representations to show to a user.

2) The method of item 1 wherein said optimization process is evaluated based on evaluation reference set beforehand.

3) The method of item 1 wherein said optimization process is evaluated based on the user's intention.

4) The method of item 3 wherein said identifiable representations are shown to the user as evaluation information on optimization process.

5) The method of any of items 1–4 wherein said identifiable representations are plants, fish, birds, mammals or living bodies including worms.

6) The method of any of items 1–4 wherein said identifiable representations are inorganic substance.

7) The method of any of items 1–6 wherein said optimization technique is an evolutionary calculation method, and both of a characteristic derived from each individual generated during evolutionary process and a characteristic derived from a present control parameter are replaced by the representations.

8) The method of item 7 wherein said characteristic derived from each individual generated during evolutionary process are shown for all of one generation.

9) The method of item 7 wherein said characteristic derived from each individual generated during evolutionary process are shown as a family tree.

10) The method of any of items 1–9 wherein said controlled system is means for controlling performance of a final controlled system.

11) The method of item 10 wherein said final controlled system is a prime mover, a motor or a combination of them.

12) The method of item 10 wherein said prime mover, said motor or said combination of them is loaded on a vehicle.

13) The method of any of items 10–12 wherein said means for controlling performance of a final controlled system is an electronic throttle, said ordinary control module inputs a manipulated variable of a throttle lever and outputs inputs a manipulated variable of an intake air amount changing means.

14) The method of item 13 wherein said ordinary control module uses control parameters on a static characteristic of the manipulated variable of the intake air amount changing means to the manipulated variable of the throttle lever, and said optimization process unit optimizes the control parameters on the static characteristic.

15) The method of item 13 wherein said ordinary control module uses control parameters on a dynamic characteristic of the manipulated variable of the intake air amount changing means to the manipulated variable of the throttle lever, as a first-order lag time constant and/or acceleration compensation factor added to a throttle input, and said optimization process unit optimizes the control parameters on the dynamic characteristic.

16) An apparatus for optimizing overall characteristics comprising:

an ordinary control unit having an ordinary control module that determines an output associated with a manipulated variable of a controlled system in response to predetermined input information an optimization process unit for optimizing control parameters of the ordinary control module using an optimization technique by heuristics a characteristic display unit for associating a change in the characteristics of the controlled system derived from the control parameters with a change or kind of representations that simulate identifiable objects, and for replacing the characteristics of the controlled system derived from the control parameters during optimization process by the representations to show to a user.

17) The apparatus of item 16 wherein said optimization process unit includes:

an optimization operation device that performs operation on an optimization technique;

an autonomy evaluation device for evaluating optimization process based on evaluation reference set beforehand, whereby said optimization process unit controls control parameters derived at the optimization operation device using the ordinary control module, and optimizes the characteristics produced as a result evaluating by the evaluation device.

18) The apparatus of item 16 wherein said characteristic display unit includes an evaluation information inputting means for inputting evaluation based on the user's intention about optimization process, and shows the representations to the user as evaluation information on optimization process.

19) The apparatus of any of items 16–18 wherein said identifiable representations are plants, fish, birds, mammals or living bodies including worms.

20) The apparatus of any of items 16–18 wherein said identifiable representations are inorganic substance.

Of course, the foregoing description is that of preferred embodiments of the invention, and various changes and modifications may be made without departing from the spirit and scope of the invention, as defined by the appended claims.

What is claimed is:

1. A method for controlling performance of a device manipulated by a user, which performance is controlled essentially by at least one control module having an input-output relationship regulated by control parameters, said method comprising the steps of:

(a) preselecting values of the control paralmeters and activating the device;

(b) on-line changing values of the control parameters within predetermined ranges under predetermined coding rules;

(c) on-line evaluating the performance of the device based on signals indicative of the performance;

(d) on-line displaying to the user the evaluation outcome in the form of single picture symbols which is preselected to intuitively represent evaluation outcomes;

(e) on-line repeating steps (b) through (d), thereby providing multiple picture symbols to the user for selection;

(f) on-line selecting values of the control parameters based on the selected symbol(s) by the user; and (g) repeating steps (e) through (f) while operating the device until desired performance of the device is demonstrated, wherein the at least one control module is optimized.

2. The method according to claim 1, wherein, in step (a), the values of the control parameters are preselected by the user using a picture symbols which is preselected to intuitively represent the control parameters' outcome.

3. The method according to claim 1, wherein the display of the symbols changes in accordance with the number of repeating cycles of steps (b) through (d).

4. The method according to claim 1, wherein the display is indicated by visual signals.

5. The method according to claim 1, wherein step (b) is conducted using heuristic processes programmed to change values of the control parameters toward a direction of obtaining rewards which are defined by the result of selection by the user in step (e).

6. The method according to claim 1, wherein the control module comprises at least one neural network, the input-output relationship of which is regulated by coupling coefficients used as the control parameters.

7. The method according to claim 1, wherein the device's performance is characterized by at least two elements, and each control module is related to a different characteristic element.

8. The method according to claim 7, wherein optimization by steps (a) through (f) is conducted on each control module in repetitive sequence.

9. The method according to claim 1, wherein the device is a control module for controlling another device.

10. The method according to claim 1, wherein the device is a motor.

11. The method according to claim 1, wherein in step (e), the multiple picture symbols are displayed as options, and in step (f), the selected potion and non-selected options are displayed, thereby showing to the user a decision tree.

12. The method according to claim 11, wherein the non-selected options are displayed in smaller size than the selected option.

13. The method according to claim 1, wherein in step (e), the multiple picture symbols are pictures of different species of fish.

14. The method according to claim 1, wherein in step (e), the multiple picture symbols are pictures of fishes having different body types.

15. A method for controlling performance of a device manipulated by a user, which performance is controlled essentially by at least one control module having an input-output relationship regulated by control parameters, said method comprising the steps of:

(a) preselecting values of the control parameters and activating the device;

(b) on-line changing values of the control parameters within predetermined ranges under predetermined coding rules;

(c) on-line evaluating the performance of the device based on signals indicative of the performance;

(d) on-line displaying to the user the evaluation outcome in the form of symbols which are pre-selected from the group consisting of fish to represent various evaluation outcomes;

(e) on-line selecting values of the control parameters based on the selected symbol(s) by the user; and (f) repeating steps (b) through (e) while operating the device until desired performance of the device is demonstrated, wherein the at least one control module is optimized.

* * * * *